United States Patent
Marchlewski et al.

(10) Patent No.: US 10,300,777 B2
(45) Date of Patent: May 28, 2019

(54) TRUCK TAILGATE SYSTEM

(71) Applicant: FORD GLOBAL TECHNOLOGIES, LLC, Dearborn, MI (US)

(72) Inventors: Jack Marchlewski, Saline, MI (US); Joshua Robert Hemphill, White Lake, MI (US); Jeffrey Gray, Dearborn, MI (US); Robert Reiners, Grosse Ile, MI (US); Jeffrey Alan Firzlaff, Royal Oak, MI (US); Casey Ray Tanner, Farmington Hills, MI (US); Sara E. Veyo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 267 days.

(21) Appl. No.: 15/484,846

(22) Filed: Apr. 11, 2017

(65) Prior Publication Data
US 2018/0290527 A1    Oct. 11, 2018

(51) Int. Cl.
*B60J 10/86* (2016.01)
*B62D 33/027* (2006.01)
*B62D 33/03* (2006.01)

(52) U.S. Cl.
CPC .......... *B60J 10/86* (2016.02); *B62D 33/0273* (2013.01); *B62D 33/03* (2013.01)

(58) Field of Classification Search
CPC . B60J 10/20; B60J 10/218; B60J 10/86; B60J 10/87; B62D 33/027; B62D 33/023; B62D 33/03; B62D 33/033; B62D 33/037; B62D 33/0276
See application file for complete search history.

(56) References Cited

U.S. PATENT DOCUMENTS

| 4,492,405 | A | * | 1/1985 | Chikaraishi | B60J 5/06 296/146.9 |
| 5,372,397 | A | | 12/1994 | Arndt | |
| 6,393,766 | B2 | * | 5/2002 | Nozaki | B60J 10/24 49/475.1 |
| 6,405,489 | B1 | * | 6/2002 | Miura | B60J 10/24 49/475.1 |
| 6,499,257 | B1 | * | 12/2002 | Tsuchida | B60J 10/248 49/493.1 |
| 6,641,205 | B1 | * | 11/2003 | Russell | B60J 5/0479 296/146.9 |
| 6,810,624 | B2 | * | 11/2004 | Fujimura | B60J 10/80 296/146.9 |
| 8,668,240 | B2 | | 3/2014 | Elliott et al. | |
| 9,016,753 | B2 | | 4/2015 | McDermott, III | |
| 10,040,341 | B2 | * | 8/2018 | Ishikawa | B60J 10/25 |

(Continued)

FOREIGN PATENT DOCUMENTS

EP    2468552 A2 *  6/2012 ............ B60J 10/248

*Primary Examiner* — Hilary L Gutman
(74) *Attorney, Agent, or Firm* — Vichit Chea; Brooks Kushman, P.C.

(57) ABSTRACT

A vehicle includes a truck bed, tailgate, and cover. The tailgate is rotatably secured to the bed. The tailgate has internal and external panels secured to each other via a sidewall extending therebetween. The external panel defines an outer periphery. The sidewall and internal panel collectively form a first radius extending adjacent and internal to a corner of the periphery. The cover is secured to the tailgate and over the first radius.

20 Claims, 3 Drawing Sheets

(56) References Cited

U.S. PATENT DOCUMENTS

| | | | |
|---|---|---|---|
| 2013/0019538 A1* | 1/2013 | Watson | B60J 10/24 |
| | | | 49/484.1 |
| 2015/0251527 A1* | 9/2015 | Moreton-Smith | B60J 5/0402 |
| | | | 296/146.7 |
| 2015/0375804 A1* | 12/2015 | Gray | B62D 33/0273 |
| | | | 296/186.3 |
| 2016/0368356 A1* | 12/2016 | Amagai | B60J 10/22 |
| 2017/0274750 A1* | 9/2017 | Sobue | B60J 10/36 |
| 2019/0031004 A1* | 1/2019 | Kanphade | B60J 10/21 |

* cited by examiner

TRUCK TAILGATE SYSTEM

TECHNICAL FIELD

The present disclosure relates to vehicles, such as trucks, that include cargo beds and tailgates that provide access to the cargo beds.

BACKGROUND

It is may be advantageous to close or seal any gaps between a truck bed and a tailgate to prevent the ingress of water or dust into the truck bed.

SUMMARY

A vehicle includes a truck bed, tailgate, and cover. The tailgate is rotatably secured to the bed. The tailgate has internal and external panels secured to each other via a sidewall extending therebetween. The external panel defines an outer periphery. The sidewall and internal panel collectively form a first radius extending adjacent and internal to a corner of the periphery. The cover is secured to the tailgate and over the first radius.

A tailgate includes an internal panel and cover. The internal panel has an outer periphery that defines a corner and a protruding surface that extends from a ledge that is adjacent to the periphery. The protruding surface is affixed to the ledge via a sidewall extending therebetween. The protruding surface and the sidewall collectively form a first radius extending adjacent and internal to the corner. The cover is secured to the tailgate and over the radius.

A tailgate includes an internal panel, external panel, and cover. The internal panel and external panel are secured to each other via a sidewall extending therebetween. The sidewall and the internal panel collectively form a first radius that extends adjacent and internal to an outer periphery of the external panel. The cover is secured to the tailgate. The cover has a faceplate and side plates that are disposed over portions of the internal panel and sidewall, respectively, that form the first radius.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
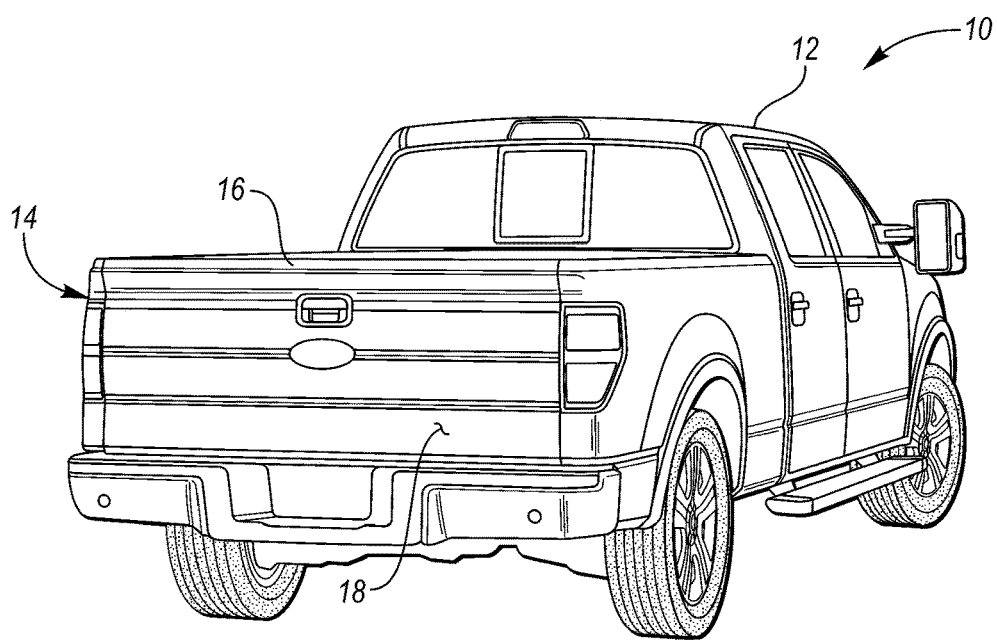
FIG. 1 is a perspective view of a vehicle having a cargo bed, such as a truck.

Referring to FIG. 1, a vehicle 10 is illustrated. The illustrated vehicle 10 may be a truck. The vehicle 10 may include a body 12 (that includes a cabin space) and a cargo bed (or truck bed) 14. The body 12 and the cargo bed 14 may each be secured to a frame. A tailgate 16 that provides access to the cargo bed 14 may be rotatably secured to the cargo bed 14. The tailgate is shown to be in an up and closed position such that an external panel (or exterior surface) 18 of the tailgate 16 is visible from the rear of the vehicle 10. The body 12 and cargo bed 14 may include various components of the vehicle's body-in-white structure. The body-in-white structure may include roof rails, pillars (such as A-pillars, B-pillars, C-pillars, D-pillar, etc.), side rails, front rails, rear rails, rocker panels, strut or shock towers, roof cross members, floor cross members, floor panels, roof panels, firewalls, radiator core supports, powertrain component supports (e.g., engine or transmission supports), or any other component of the vehicle body-in-white structure or the frame known in the art. The body components may be connected to each other by a welding process or by fasteners, such as rivets, screws, bolts, or any other type of faster known to a person of ordinary skill in the art.

Figure 2:
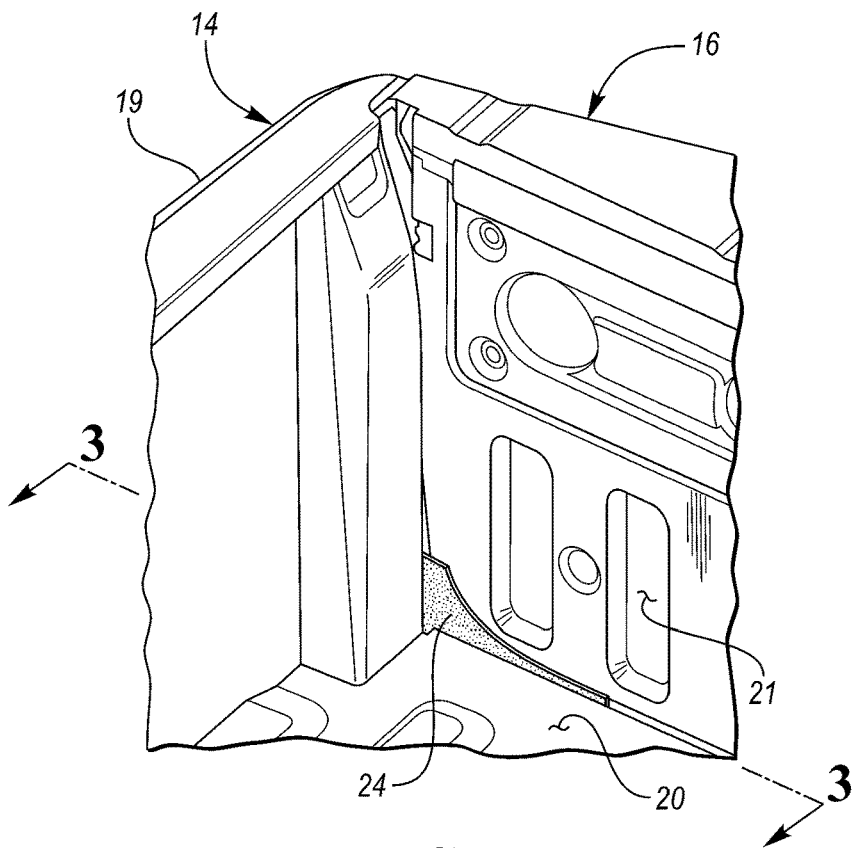
FIG. 2 is an internal view of the cargo bed that includes a side portion of the cargo bed, the bed floor, and the tailgate.

Referring to FIG. 2, an internal view of the cargo bed 14 that includes side portion of the cargo bed 19, the tailgate 16, and a bed floor 20 is illustrated. The tailgate 16 is also shown to be in the up and closed position in FIG. 2 such that an internal (or interior surface) 21 of the tailgate 16 is visible from inside the cargo bed 14. A cover 24 is secured to a lower internal corner of the tailgate 16.

Figure 3:
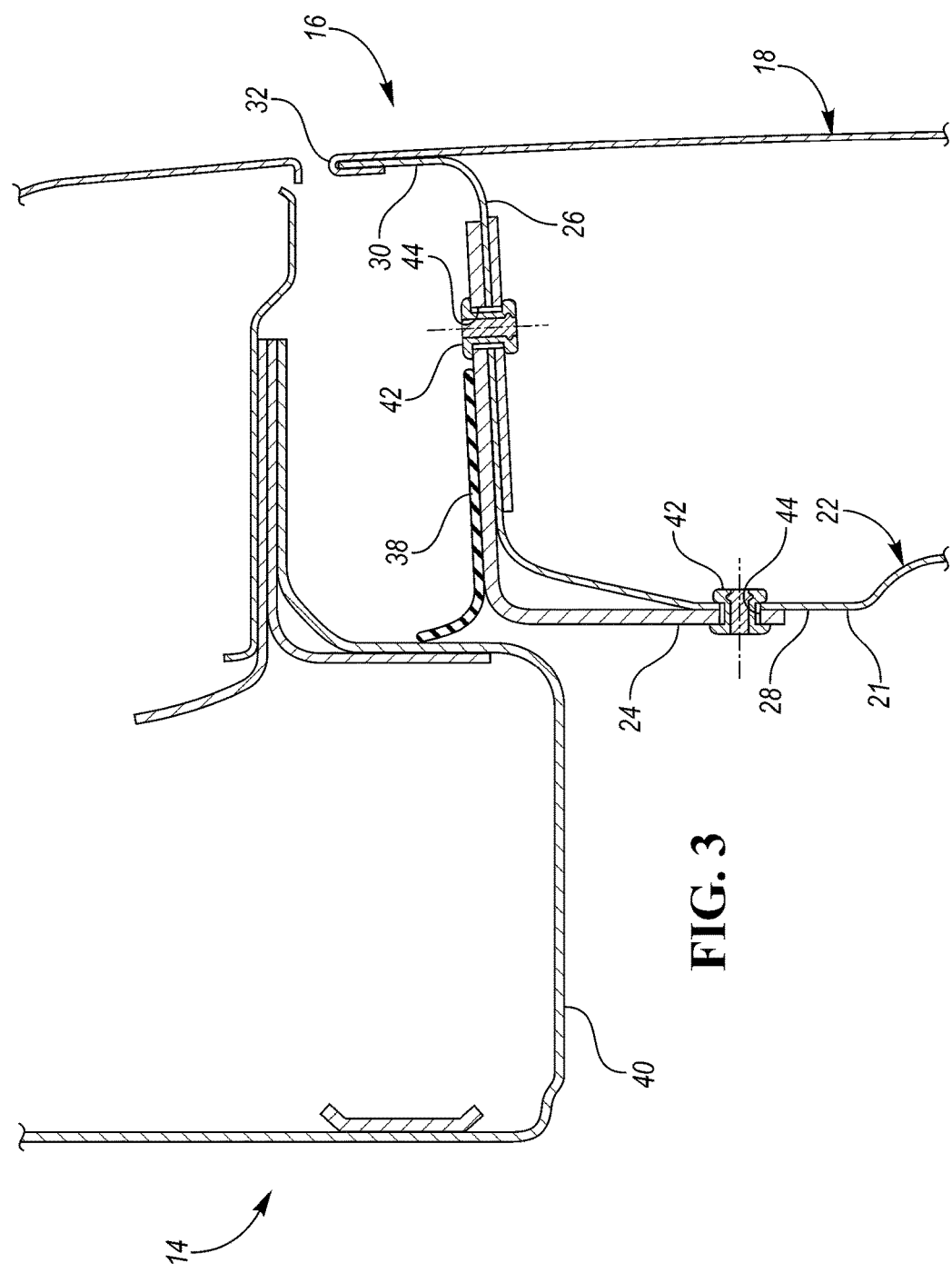
FIG. 3 is a cross-sectional view taken along line 3-3 in FIG. 2.
Figure 4:
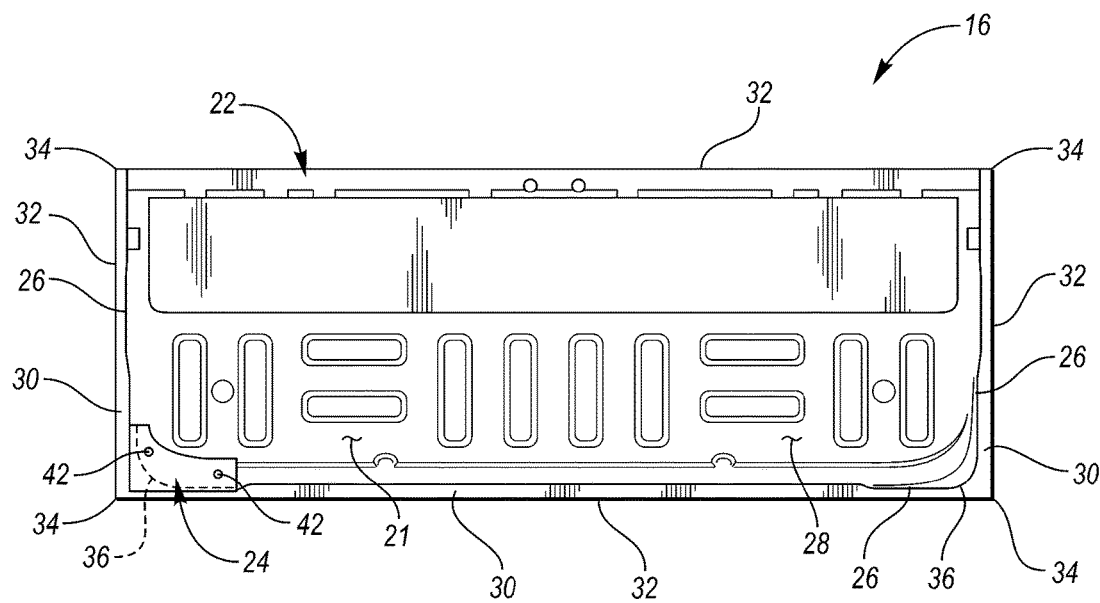
FIG. 4 is an internal view of the tailgate.

Referring to FIGS. 3 and 4, a cross-sectional view taken along line 3-3 in FIG. 2 and an internal view of the tailgate are illustrated, respectively. The external panel 18 of the tailgate 16 is secured to the internal panel 22 of the tailgate by sidewall 26 that extends between the external panel 18 and the internal panel 22. The internal panel 22 has a protruding surface 28 that extends from a ledge 30. The protruding surface 28 may be affixed to the ledge 30 via the sidewall 26. The ledge 30 may be adjacent to a periphery 32 of the tailgate 16. The internal panel 22 of the tailgate 16 may be secured to the external panel 18 of the tailgate by the sidewall 26 via the ledge 30. The sidewall 26 and ledge 30 are shown to be integral components of the internal panel 22. However, it should be understood that the sidewall 26 and ledge 30 may be separate components relative to each other and/or the internal panel 22. The periphery 32 of the tailgate 16 may be defined by the external panel 18, the internal panel 22, and/or where the external panel 18 is secured to the internal panel 22 (if the sidewall 26 and ledge 30 are considered components of the internal panel 22). The external panel 18 and the internal panel 22 may be sheet metal components. The external panel 18 and the internal panel 22 may be secured to each other by folding an edge of one of the external panel 18 or the internal panel 22 over the edge of the other, and crimping or welding the sheet metal that comprises the panels at the fold.

The outer periphery 32 of the tailgate 16 may define a plurality of corners 34. The protruding surface 28 and the sidewall 26 may collectively form radii 36 extending adjacent and internal to the two lower corners 34. In the alternative, it may be stated that the internal panel 22 and the sidewall 26 collectively form the radii 36 extending adjacent and internal to the lower corners 34 defined by the outer periphery 32.

The radii 36 may be formed during a stamping process that creates the internal panel 22 from a sheet metal blank. When an aluminum blank is used to form the internal panel 22, larger radii may be required due to the material properties of aluminum. Testing has indicated that designs with smaller radii caused the aluminum sheet to split. Larger radii, however, resulted in larger gaps between the tailgate 16 and the cargo bed 14. The large gaps between the tailgate 16 and the cargo bed 14 may be aesthetically unpleasing to customers. The large gaps may also create entry points for water or dust to seep into the cargo bed 14 when customers attempt to prevent water or dust from entering into the cargo bed 14 by placing a tonneau cover over the open top of the cargo bed 14. Covers 24 may be secured to each of the lower two internal corners 34 and over the radii 36 in order to prevent the ingress of dust or water into the cargo bed 14. It should be noted that only one cover 24 is shown in FIG. 4 so that one of the radii 36 formed during the stamping process may be illustrated.

Seals 38, such as a rubber seals, may be secured to the covers 24. The seals 38 may be disposed between the covers 24 and the cargo bed. The seals 38 may be configured to contact a portion of the cargo bed 14 (such as the D-pillar 40) when the tailgate 16 is in the up and closed position to further reduce the ingress of dust or water into the cargo bed 14. Alternatively, the seals 38 may be secured to a portion of the cargo bed (such as D-pillar 40) and configured to contact a portion of the tailgate 16 when the tailgate 16 is in the up and closed position to further reduce the ingress of dust or water into the cargo bed 14.

The covers 24 may be secured to the tailgate 16 by at least one fastener 42. The covers 24 may define orifices 44. The fasteners 42 may extend through the orifices 44 and engage the tailgate 16 in order to secure the covers 24 to the tailgate. The fasteners 42 may be rivets, screws, bolts (including a nut and bolt combination), or any other type of faster known to a person of ordinary skill in the art. More specifically, the fasteners 42 may also engage orifices defined by the tailgate 16 in order to secure the covers to the tailgate 16. The orifices 44 defined by the covers 24 and the orifices defined the tailgate 16 may be through holes or tapped holes depending on the type of faster and how the fastener is used.

Alternatively, the covers 24 may be secured to the tailgate 16 by clips that extend from the tailgate 16. The clips may be J-hook types of devices that include flexible necks and ledges that are perpendicular to the necks. The necks of the clips may extend from the tailgate 16 to the ledges of the clips. The ledges of the clips may be wider the than the necks of the clips. The covers 24 may define T-slots. The clips may extend through the T-slots and engage the covers 24 proximate to the narrow portions of the T-slots, which have widths that are smaller than widths of the ledges, to secure the covers 24 to the tailgate. During installment, the necks may flex such that the ledges may extend through the wider portion of the T-slots, which have widths that are larger than widths of the ledges. At least two clips may be utilized to secure each cover 24 to the tailgate 16. At least two of the clips used to secure a single cover to the tailgate 16 may oriented such that the ledges extend in directions that perpendicular to each other. At least two of the T-slots defined by a single cover may be oriented perpendicular to each other so that the clips can properly engage the T-slots.

Figure 5:
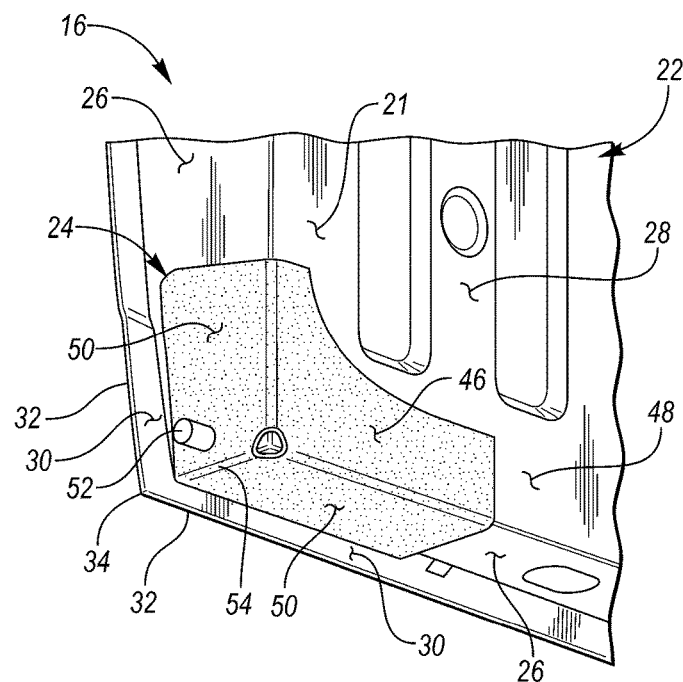
FIG. 5 is a perspective view of a cover that is secured to the tailgate.

Referring to FIG. 5, a perspective view of one of the covers 24 that is secured to the tailgate 16 is illustrated. The cover 24 includes a faceplate 46 that is disposed on an exterior surface 48 of the internal panel 22 and over a portion of the internal panel 22 that forms the radius 36. The exterior surface 48 of the internal panel 22 may refer to the internal (or interior surface) 21 of the tailgate 16 and/or the protruding surface 28 of the internal panel 22. The cover 24 also includes a pair of side plates 50 that extend from the faceplate 46 toward a portion of the internal panel 22 that is proximate to a lower internal corner 34 defined by the periphery 32. The pair of side plates 50 are disposed over a portion of the sidewall 26 that forms the radius 36. Alternatively, it may be stated that the pair of side plates 50 extend from the faceplate toward the ledge 30 that is proximate to a lower internal corner 34 defined by the periphery 32. A hinge pin 52 that rotatably secures the tailgate 16 to the cargo bed 14 may extend from one of the pair of side plates 50. The hinge pin 52 may be integral to the cover 24 or may be secured to the cover 24 by welds, fasteners, a pressing operation, or by any other method known in the art.

The pair of side plates 50 may form a second radius 54 that is disposed over the radius 36 formed by the protruding surface 28 and the sidewall 26. The radii 36 formed in the internal panel 22 may be referred to as the first radii in plural form or first radius in singular form. The second radius 54 may be smaller than the first radius 36. Alternatively, the cover 24 may geometrically have a sharp corner where the pair of side plates 50 merge instead of having the second radius 54.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:
1. A vehicle comprising:
   a truck bed;
   a tailgate, rotatably secured to the bed, having internal and external panels secured to each other via a sidewall extending therebetween, the external panel defining an outer periphery, and the sidewall and internal panel collectively forming a first radius extending adjacent and internal to a corner of the periphery; and
   a cover secured to the tailgate and over the first radius.
2. The vehicle of claim 1, wherein the cover includes a faceplate that is disposed on an exterior surface of the internal panel and over a portion of the internal panel that forms the first radius.
3. The vehicle of claim 2, wherein the cover includes a pair of side plates that extend from the faceplate toward a portion of the internal panel proximate to the corner of the periphery, the side plates disposed over a portion of the sidewall that forms the first radius.

4. The vehicle of claim 3, wherein the side plates form a second radius that is disposed over and smaller than the first radius.

5. The vehicle of claim 3 further comprising a hinge pin extending from one of the side plates, the hinge pin rotatably securing the tailgate to the truck bed.

6. The vehicle of claim 1 further comprising at least one fastener that secures the cover to the tailgate.

7. The vehicle of claim 6, wherein the cover defines an orifice, and the fastener extends through the orifice and engages the tailgate to secure the cover to the tailgate.

8. The vehicle of claim 1, further comprising a seal that is disposed between the cover and the truck bed.

9. A tailgate rotatably secured to a truck bed by a hinge pin comprising:
   an internal panel having an outer periphery that defines a corner and having a protruding surface extending from a ledge that is adjacent to the periphery, the protruding surface affixed to the ledge via a sidewall extending therebetween, and the protruding surface and the sidewall collectively forming a first radius extending adjacent and internal to the corner; and
   a cover secured to the tailgate and over the radius.

10. The tailgate of claim 9, wherein the cover includes a faceplate that is disposed on and over a portion of the protruding surface that forms the first radius.

11. The tailgate of claim 10, wherein the cover includes a pair of side plates that extend from the faceplate toward the ledge proximate to the corner of the periphery, the side plates disposed over a portion of the sidewall that forms the first radius.

12. The tailgate of claim 11, wherein the side plates form a second radius that is disposed over and smaller than the first radius.

13. The tailgate of claim 11 further comprising the hinge pin extending from one of the side plates, the hinge pin configured to rotatably secure the tailgate to a truck bed.

14. The tailgate of claim 9 further comprising at least one fastener that secures the cover to the tailgate.

15. The tailgate of claim 14, wherein the cover defines an orifice, and the fastener extends through the orifice and engages the tailgate to secure the cover to the tailgate.

16. A tailgate rotatably secured to a truck bed by a hinge pin comprising:
   internal and external panels secured to each other via a sidewall extending therebetween, the sidewall and internal panel collectively forming a first radius extending adjacent and internal to an outer periphery of the external panel; and
   a cover secured to the tailgate, having a faceplate and side plates that are disposed over portions of the internal panel and sidewall, respectively, that form the first radius.

17. The tailgate of claim 16, wherein the side plates extend from the faceplate toward a portion of the internal panel proximate to a corner defined by the periphery.

18. The tailgate of claim 17, wherein the side plates form a second radius that is disposed over and smaller than the first radius.

19. The tailgate of claim 17, further comprising the hinge pin extending from one of the side plates, the hinge pin configured to rotatably secure the tailgate to a truck bed.

20. The tailgate of claim 16, further comprising at least one fastener that secures the cover to the tailgate.

* * * * *